(12) United States Patent
He et al.

(10) Patent No.: US 12,531,708 B2
(45) Date of Patent: Jan. 20, 2026

(54) INDICATING TRANSMISSION CONFIGURATION INDICATOR STATE BASED ON APERIODIC CHANNEL STATE INFORMATION REFERENCE SIGNAL

(71) Applicant: QUALCOMM Incorporated, San Diego, CA (US)

(72) Inventors: Ruhua He, San Diego, CA (US); Raghu Narayan Challa, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/482,234

(22) Filed: Oct. 6, 2023

(65) Prior Publication Data
US 2024/0204972 A1 Jun. 20, 2024

Related U.S. Application Data

(60) Provisional application No. 63/387,440, filed on Dec. 14, 2022.

(51) Int. Cl.
*H04L 5/00* (2006.01)
*H04W 72/02* (2009.01)
*H04W 72/232* (2023.01)

(52) U.S. Cl.
CPC .......... *H04L 5/0096* (2013.01); *H04L 5/0048* (2013.01); *H04W 72/02* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2021/0195583 A1 | 6/2021 | Venugopal et al. | |
| 2021/0226689 A1 | 7/2021 | Farag et al. | |
| (Continued) | | | |

OTHER PUBLICATIONS

International Search Report and Written Opinion—PCT/US2023/079239—ISA/EPO—Feb. 23, 2024.
(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that configures transmission configuration indicator (TCI) states based at least in part on aperiodic channel state information reference signals (AP-CSI-RSs), where each TCI state includes a first resource that is an aperiodic tracking reference signal (AP-TRS) and a second resource that is an AP-CSI-RS. The UE may receive first downlink control information that triggers a first AP-CSI-RS resource set that includes AP-CSI-RSs that are each associated with a quasi-co-location (QCL) Type-D resource. The UE may transmit a report that indicates one or more AP-CSI-RSs. The UE may receive an activation command that activates a TCI state associated with a first narrow beam, where a combination of a first AP-CSI-RS and a first associated QCL Type-D resource uniquely indicates the first narrow beam. Numerous other aspects are described.

22 Claims, 12 Drawing Sheets

(56) References Cited

U.S. PATENT DOCUMENTS

| | | | | |
|---|---|---|---|---|
| 2022/0158715 A1* | 5/2022 | Bishwarup | ............ | H04W 72/23 |
| 2022/0232546 A1* | 7/2022 | Hakola | ................ | H04W 48/12 |
| 2022/0264577 A1* | 8/2022 | Bai | ...................... | H04W 72/53 |
| 2023/0007504 A1* | 1/2023 | Jang | ..................... | H04B 7/0695 |
| 2023/0083208 A1* | 3/2023 | Zhang | ................. | H04W 72/232 |
| | | | | 370/329 |
| 2023/0189284 A1* | 6/2023 | Cheng | .................. | H04W 24/10 |
| | | | | 370/329 |
| 2023/0239114 A1* | 7/2023 | Kim | ...................... | H04W 16/28 |
| | | | | 370/329 |
| 2023/0269041 A1* | 8/2023 | Rong | .................. | H04B 7/0695 |
| | | | | 370/329 |
| 2024/0015740 A1* | 1/2024 | Xiao | ................. | H04W 72/1273 |
| 2024/0048339 A1* | 2/2024 | He | ......................... | H04L 5/0057 |
| 2024/0204955 A1* | 6/2024 | Yang | .................... | H04L 5/0053 |

OTHER PUBLICATIONS

Moderator (Samsung): "Moderator Summary#2 for Multi-beam Enhancement", 3GPP TSG RAN WG1 #103-e, R1-2009499, 3rd Generation Partnership Project, Mobile Competence Centre, 650, Route Des Lucioles, F-06921 Sophia-Antipolis Cedex, France, vol. Ran WG1, No. e-Meeting, Oct. 26, 2020-Nov. 13, 2020, Nov. 13, 2020, 42 Pages, XP052351412, The Whole Document.

\* cited by examiner

INDICATING TRANSMISSION CONFIGURATION INDICATOR STATE BASED ON APERIODIC CHANNEL STATE INFORMATION REFERENCE SIGNAL

CROSS-REFERENCE TO RELATED APPLICATION

This patent application claims priority to U.S. Provisional Patent Application No. 63/387,440, filed on Dec. 14, 2022, entitled "INDICATING TRANSMISSION CONFIGURATION INDICATOR STATE BASED ON APERIODIC CHANNEL STATE INFORMATION REFERENCE SIGNAL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating a transmission configuration indicator state based on an aperiodic channel state information reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network entity. The method may include transmitting a configuration that configures transmission configuration indicator (TCI) states based at least in part on aperiodic channel state information reference signals (AP-CSI-RSs), where each TCI state includes a first resource that is an aperiodic tracking reference signal (AP-TRS) and a second resource that is an AP-CSI-RS. The method may include transmitting first downlink control information (DCI) that triggers a first AP-CSI-RS resource set that includes AP-CSI-RSs that are each associated with a quasi-co-location (QCL) Type-D resource, where the QCL Type-D resource is a TRS or a synchronization signal block (SSB). The method may include receiving a report of one or more AP-CSI-RSs. The method may include selecting a first AP-CSI-RS from among the one or more AP-CSI-RSs, where a combination of the first AP-CSI-RS and a first associated QCL Type-D resource uniquely indicates a first narrow beam. The method may include transmitting an activation command that activates a TCI state associated with the first narrow beam. The method may include transmitting or receiving a reference signal using the TCI state.

Some aspects described herein relate to a method of wireless communication performed by a user equipment (UE). The method may include receiving a configuration that configures TCI states based at least in part on AP-CSI-RSs, where each TCI state includes a first resource that is an AP-TRS and a second resource that is an AP-CSI-RS. The method may include receiving first DCI that triggers a first AP-CSI-RS resource set that includes AP-CSI-RSs that are each associated with a QCL Type-D resource, where the QCL Type-D resource is a TRS or an SSB. The method may include selecting one or more AP-CSI-RSs based at least in part on AP-CSI-RS measurements. The method may include transmitting a report that indicates the one or more AP-CSI-RSs. The method may include receiving an activation command that activates a TCI state associated with a first narrow beam, where a combination of a first AP-CSI-RS and a first associated QCL Type-D resource uniquely indicates the first narrow beam. The method may include transmitting or receiving a reference signal using the TCI state.

Some aspects described herein relate to a network entity for wireless communication. The network entity may include memory, one or more processors coupled to the memory, and instructions stored in the memory and executable by the one or more processors (e.g., directly, indirectly, after pre-processing, without pre-processing). The instructions may be executable by the one or more processors to cause the network entity to transmit a configuration that configures TCI states based at least in part on AP-CSI-RSs, where each TCI state includes a first resource that is an AP-TRS and a second resource that is an AP-CSI-RS. The instructions may be executable by the one or more processors to cause the network entity to transmit first DCI that triggers a first AP-CSI-RS resource set that includes AP-CSI-RSs that are each associated with a QCL Type-D resource, where the QCL Type-D resource is a TRS or an SSB. The instructions may be executable by the one or more processors to cause the network entity to receive a report of one or more AP-CSI-RSs. The instructions may be executable by the one or more processors to cause the network entity to select a first AP-CSI-RS from among the one or more AP-CSI-RSs, where a combination of the first AP-CSI-RS and a first associated QCL Type-D resource uniquely indicates a first narrow beam. The instructions may be executable by the one or more processors to cause the network entity to transmit an activation command that activates a TCI state associated with the first narrow beam. The instructions may be executable by the one or more processors to cause the network entity to transmit or receive a reference signal using the TCI state.

Some aspects described herein relate to a UE for wireless communication. The UE may include memory, one or more processors coupled to the memory, and instructions stored in the memory and executable by the one or more processors (e.g., directly, indirectly, after pre-processing, without pre-processing). The instructions may be executable by the one or more processors to cause the UE to receive a configuration that configures TCI states based at least in part on AP-CSI-RSs, where each TCI state includes a first resource that is an AP-TRS and a second resource that is an AP-CSI-RS. The instructions may be executable by the one or more processors to cause the user equipment to receive first DCI that triggers a first AP-CSI-RS resource set that includes AP-CSI-RSs that are each associated with a QCL Type-D resource, where the QCL Type-D resource is a TRS or an SSB. The instructions may be executable by the one or more processors to cause the user equipment to select one or more AP-CSI-RSs based at least in part on AP-CSI-RS measurements. The instructions may be executable by the one or more processors to cause the user equipment to transmit a report that indicates the one or more AP-CSI-RSs. The instructions may be executable by the one or more processors to cause the user equipment to receive an activation command that activates a TCI state associated with a first narrow beam, wherein a combination of a first AP-CSI-RS and a first associated QCL Type-D resource uniquely indicates the first narrow beam. The instructions may be executable by the one or more processors to cause the user equipment to transmit or receive a reference signal using the TCI state.

Some aspects described herein relate to a non-transitory computer-readable medium that stores one or more instructions for wireless communication by a network entity. The one or more instructions, when executed by one or more processors of the network entity, may cause the network entity to transmit a configuration that configures TCI states based at least in part on AP-CSI-RSs, where each TCI state includes a first resource that is an AP-TRS and a second resource that is an AP-CSI-RS. The one or more instructions, when executed by one or more processors of the network entity, may cause the network entity to transmit first DCI that triggers a first AP-CSI-RS resource set that includes AP-CSI-RSs that are each associated with a QCL Type-D resource, where the QCL Type-D resource is a TRS or an SSB. The one or more instructions, when executed by one or more processors of the network entity, may cause the network entity to receive a report of one or more AP-CSI-RSs. The one or more instructions, when executed by one or more processors of the network entity, may cause the network entity to select a first AP-CSI-RS from among the one or more AP-CSI-RSs, where a combination of the first AP-CSI-RS and a first associated QCL Type-D resource uniquely indicates a first narrow beam. The one or more instructions, when executed by one or more processors of the network entity, may cause the network entity to transmit an activation command that activates a TCI state associated with the first narrow beam. The one or more instructions, when executed by one or more processors of the network entity, may cause the network entity to transmit or receive a reference signal using the TCI state.

Some aspects described herein relate to a non-transitory computer-readable medium that stores one or more instructions for wireless communication by a UE. The one or more instructions, when executed by one or more processors of the UE, may cause the UE to receive a configuration that configures TCI states based at least in part on AP-CSI-RSs, where each TCI state includes a first resource that is an AP-TRS and a second resource that is an AP-CSI-RS. The one or more instructions, when executed by one or more processors of the UE, may cause the UE to receive first DCI that triggers a first AP-CSI-RS resource set that includes AP-CSI-RSs that are each associated with a QCL Type-D resource, where the QCL Type-D resource is a TRS or an SSB. The one or more instructions, when executed by one or more processors of the UE, may cause the UE to select one or more AP-CSI-RSs based at least in part on AP-CSI-RS measurements. The one or more instructions, when executed by one or more processors of the UE, may cause the UE to transmit a report that indicates the one or more AP-CSI-RSs. The one or more instructions, when executed by one or more processors of the UE, may cause the UE to receive an activation command that activates a TCI state associated with a first narrow beam, where a combination of a first AP-CSI-RS and a first associated QCL Type-D resource uniquely indicates the first narrow beam. The one or more instructions, when executed by one or more processors of the UE, may cause the UE to transmit or receive a reference signal using the TCI state.

Some aspects described herein relate to an apparatus for wireless communication. The apparatus may include means for transmitting a configuration that configures TCI states based at least in part on AP-CSI-RSs, where each TCI state includes a first resource that is an AP-TRS and a second resource that is an AP-CSI-RS. The apparatus may include means for transmitting first DCI that triggers a first AP-CSI-RS resource set that includes AP-CSI-RSs that are each associated with a QCL Type-D resource, where the QCL Type-D resource is a TRS or an SSB. The apparatus may include means for receiving a report of one or more AP-CSI-RSs. The apparatus may include means for selecting a first AP-CSI-RS from among the one or more AP-CSI-RSs, where a combination of the first AP-CSI-RS and a first associated QCL Type-D resource uniquely indicates a first narrow beam. The apparatus may include means for transmitting an activation command that activates a TCI state associated with the first narrow beam. The apparatus may include means for transmitting or receiving a reference signal using the TCI state.

Some aspects described herein relate to an apparatus for wireless communication. The apparatus may include means for receiving a configuration that configures TCI states based at least in part on AP-CSI-RSs, where each TCI state includes a first resource that is an AP-TRS and a second resource that is an AP-CSI-RS. The apparatus may include means for receiving first DCI that triggers a first AP-CSI-RS resource set that includes AP-CSI-RSs that are each associated with a QCL Type-D resource, where the QCL Type-D resource is a TRS or an SSB. The apparatus may include means for selecting one or more AP-CSI-RSs based at least in part on AP-CSI-RS measurements. The apparatus may include means for transmitting a report that indicates the one or more AP-CSI-RSs. The apparatus may include means for receiving an activation command that activates a TCI state associated with a first narrow beam, where a combination of a first AP-CSI-RS and a first associated QCL Type-D resource uniquely indicates the first narrow beam. The apparatus may include means for transmitting or receiving a reference signal using the TCI state.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
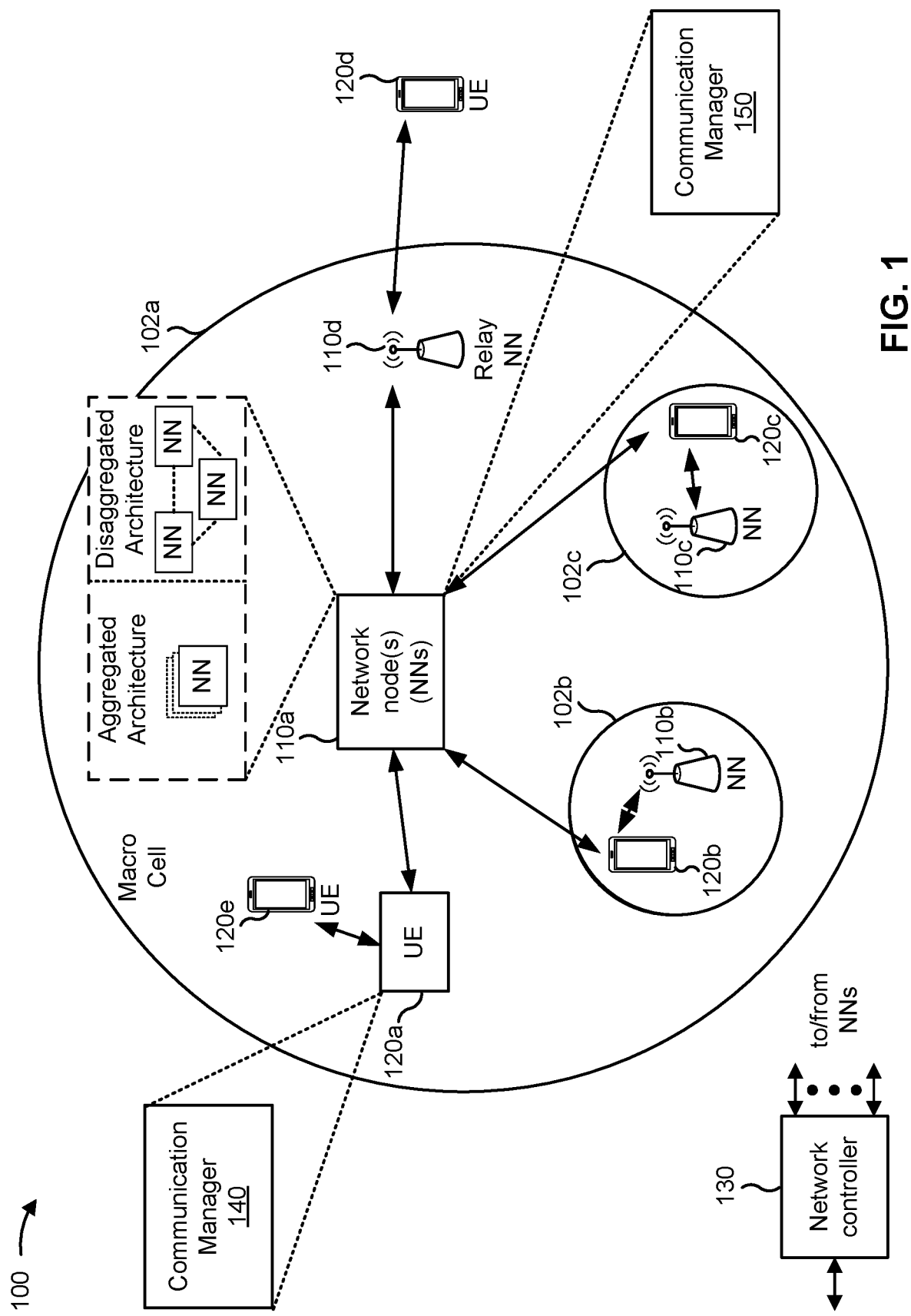
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive a configuration that configures transmission configuration indicator (TCI) states based at least in part on aperiodic channel state information reference signals (AP-CSI-RSs), where each TCI state includes a first resource that is an aperiodic tracking reference signal (AP-TRS) and a second resource that is an AP-CSI-RS. The communication manager 140 may receive first downlink control information (DCI) that triggers a first AP-CSI-RS resource set that includes AP-CSI-RSs that are each associated with a quasi-co-location (QCL) Type-D resource, where the QCL Type-D resource is a TRS or a synchronization signal block (SSB). The communication manager 140 may select one or more AP-CSI-RSs based at least in part on AP-CSI-RS measurements; transmit a report that indicates the one or more AP-CSI-RSs. The communication manager 140 may receive an activation command that activates a TCI state associated with a first narrow beam, where a combination of a first AP-CSI-RS and a first associated QCL Type-D resource uniquely indicates the first narrow beam. The communication manager 140 may transmit or receive a reference signal using the TCI state. Additionally, or alternatively, the communication manager 140 may perform one or more other operations described herein.

In some aspects, a network entity (e.g., network node 110) may include a communication manager 150. As described in more detail elsewhere herein, the communication manager 150 may transmit a configuration that configures TCI states based at least in part on AP-CSI-RSs, where each TCI state includes a first resource that is an AP-TRS and a second resource that is an AP-CSI-RS. The communication manager 150 may transmit first DCI that triggers a first AP-CSI-RS resource set that includes AP-CSI-RSs that are each associated with a QCL Type-D resource, where the QCL Type-D resource is a TRS or an SSB. The communication manager 140 may receive a report of one or more AP-CSI-RSs. The communication manager 140 may select a first AP-CSI-RS from among the one or more AP-CSI-RSs, where a combination of the first AP-CSI-RS and a first associated QCL Type-D resource uniquely indicates a first narrow beam. The communication manager 140 may transmit an activation command that activates a TCI state associated with the first narrow beam. The communication manager 140 may transmit or receive a reference signal using the TCI state. Additionally, or alternatively, the communication manager 150 may perform one or more other operations described herein.

As indicated above, FIG. 1 is provided as an example. Other examples may differ from what is described with regard to FIG. 1.

Figure 2:
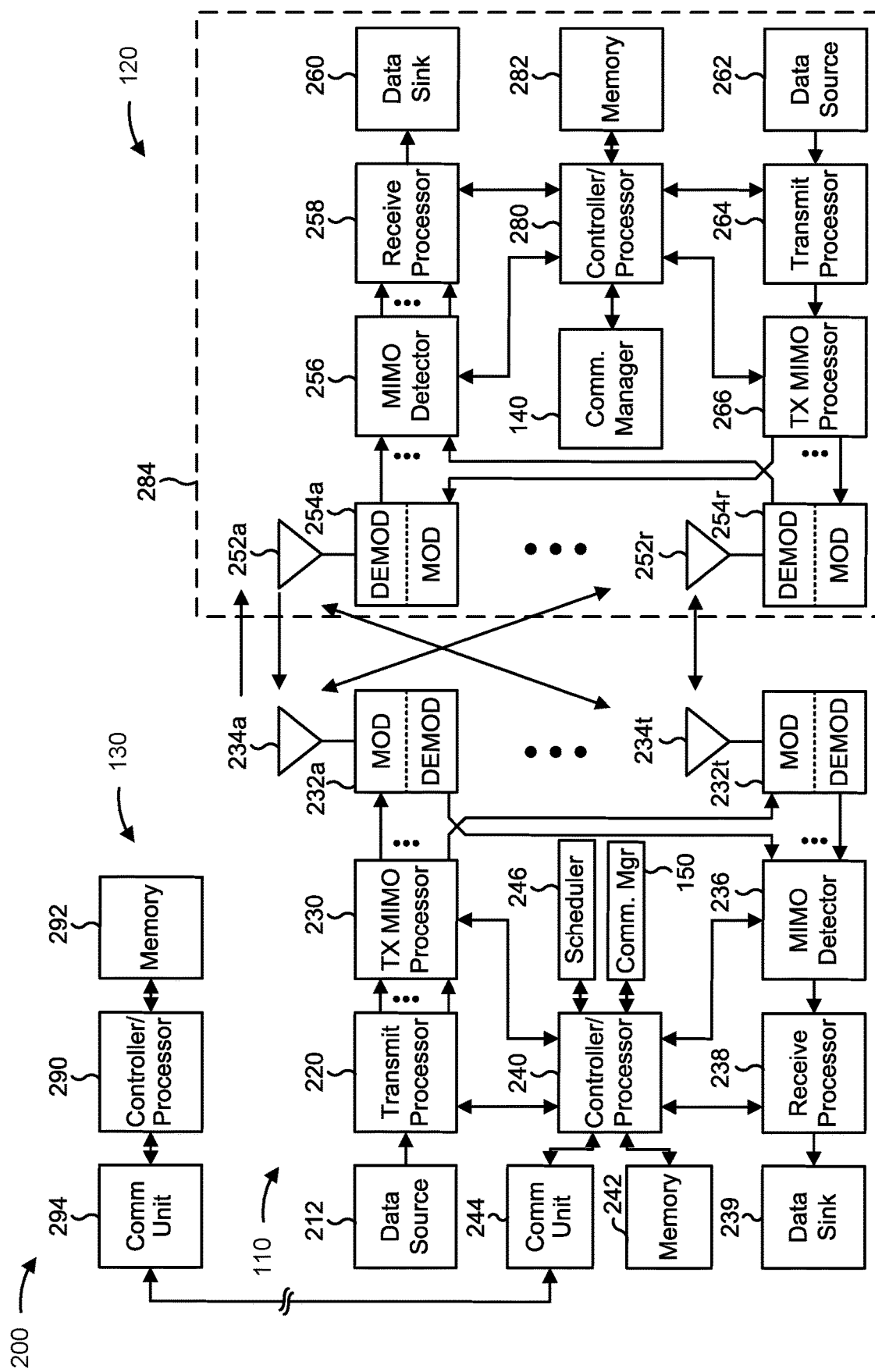
FIG. 2 is a diagram illustrating an example of a network entity (e.g., network node) in communication with a user equipment (UE) in a wireless network, in accordance with the present disclosure.

FIG. 2 is a diagram illustrating an example 200 of a network entity (e.g., network node 110) in communication with a UE 120 in a wireless network 100, in accordance with the present disclosure. The network node 110 may be equipped with a set of antennas 234a through 234t, such as T antennas (T≥ 1). The UE 120 may be equipped with a set of antennas 252a through 252r, such as R antennas (R≥ 1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor of a network entity (e.g., controller/processor 240 of the network node 110), the controller/processor 280 of the UE 120, and/or any other component(s) of FIG. 2 may perform one or more techniques associated with defining TCI states based on AP-CSI-RS IDs, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a network entity (e.g., network node 110) includes means for transmitting a configuration that configures TCI states based at least in part on AP-CSI-RSs, where each TCI state includes a first resource that is an AP-TRS and a second resource that is an AP-CSI-RS; means for transmitting first DCI that triggers a first AP-CSI-RS resource set that includes AP-CSI-RSs that are each associated with a QCL Type-D resource, where the QCL Type-D resource is a TRS or an SSB; means for receiving a report of one or more AP-CSI-RSs; means for selecting a first AP-CSI-RS from among the one or more AP-CSI-RSs, where a combination of the first AP-CSI-RS and a first associated QCL Type-D resource uniquely indicates a first narrow beam; means for transmitting an activation command that activates a TCI state associated with the first narrow beam; and/or means for transmitting or receiving a reference signal using the TCI state. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., UE 120) includes means for receiving a configuration that configures TCI states based at least in part on AP-CSI-RSs, where each TCI state includes a first resource that is an AP-TRS and a second resource that is an AP-CSI-RS; means for receiving first DCI that triggers a first AP-CSI-RS resource set that includes AP-CSI-RSs that are each associated with a QCL Type-D resource, where the QCL Type-D resource is a TRS or an SSB; means for selecting one or more AP-CSI-RSs based at least in part on AP-CSI-RS measurements; means for transmitting a report that indicates the one or more AP-CSI-RSs; means for receiving an activation command that activates a TCI state associated with a first narrow beam, where a combination of a first AP-CSI-RS and a first associated QCL Type-D resource uniquely indicates the first narrow beam; and/or means for transmitting or receiving a reference signal using the TCI state. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
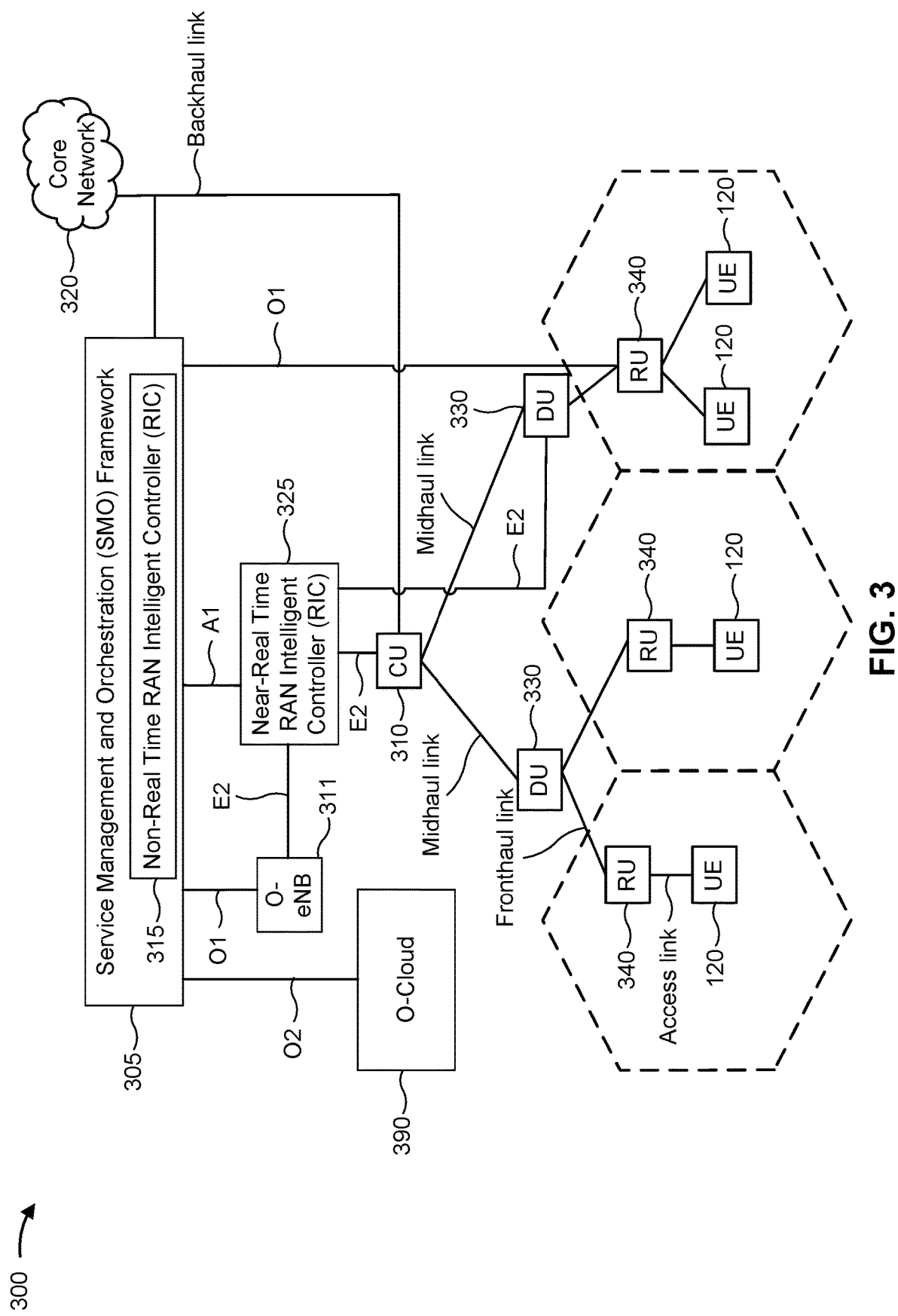
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
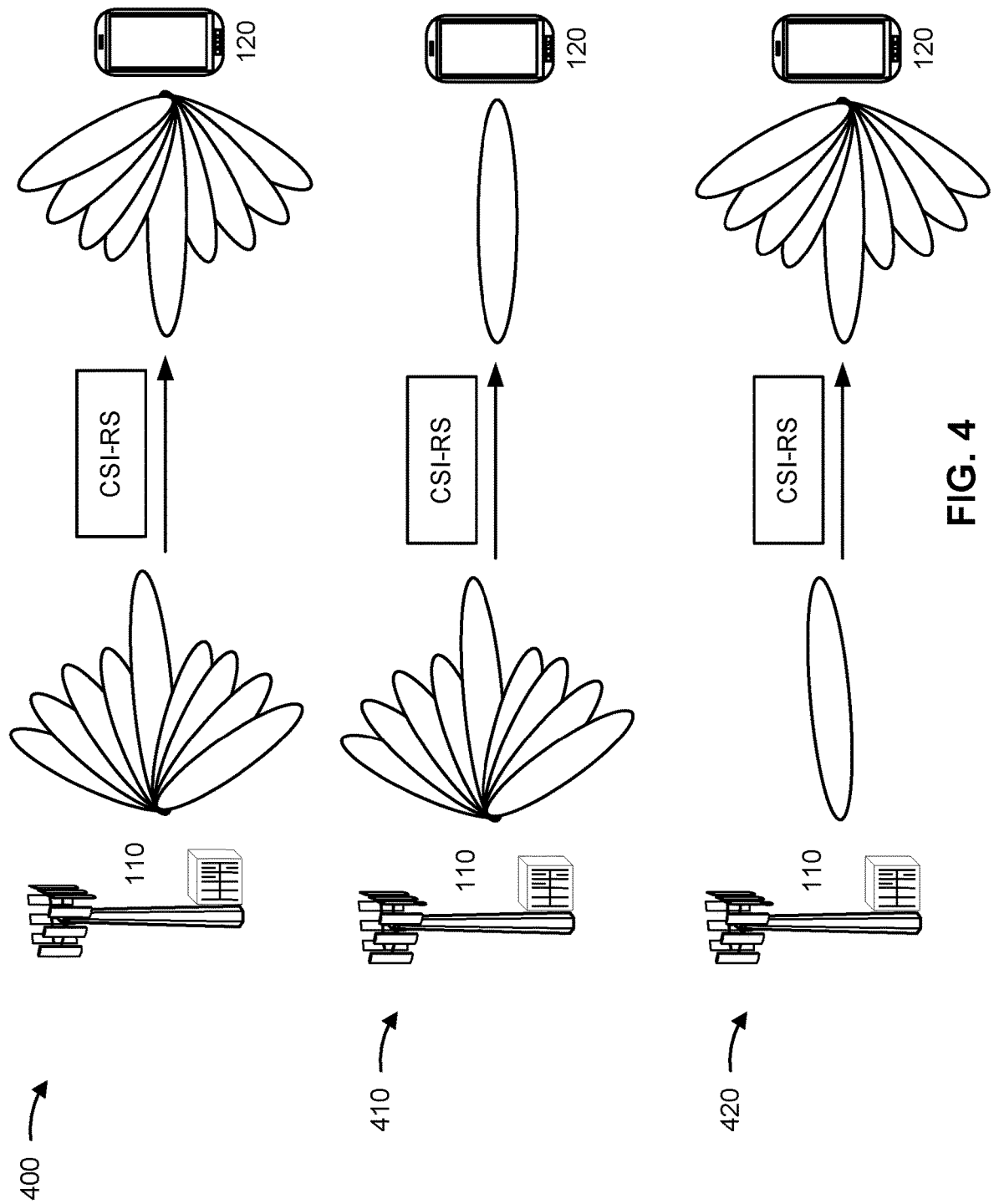
FIG. 4 is a diagram illustrating examples of channel state information reference signal (CSI-RS) beam management procedures, in accordance with the present disclosure.

FIG. 4 is a diagram illustrating examples 400, 410, and 420 of CSI-RS beam management procedures, in accordance with the present disclosure. As shown in FIG. 4, examples 400, 410, and 420 include a UE 120 in communication with a network entity (e.g., network node 110) in a wireless network (e.g., wireless network 100). However, the devices shown in FIG. 4 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using MAC control element (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same reference signal (RS) resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use SSBs for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the UE 120 to select a best receive beam based at least in part on measurements made by the UE 120 (e.g., of the CSI-RS of the transmit beam using the one or more receive beams).

The network node 110 may transmit to UEs 120 located within a coverage area of the network node 110. The network node 110 and a UE 120 may be configured for beamformed communications, where the network node 110 may transmit in the direction of the UE 120 using a directional network node (NN) transmit beam (e.g., a NN transmit beam), and the UE 120 may receive the transmission using a directional UE receive beam. Each NN transmit beam may have an associated beam ID, beam direction, or beam symbols, among other examples. The network node 110 may transmit downlink communications via one or more NN transmit beams.

The UE 120 may attempt to receive downlink transmissions via one or more UE receive beams, which may be configured using different beamforming parameters at receive circuitry of the UE 120. The UE 120 may identify a particular NN transmit beam and a particular UE receive beam that provide relatively favorable performance (for example, that have a best channel quality of the different measured combinations of NN transmit beams and UE receive beams). In some examples, the UE 120 may transmit an indication of which NN transmit beam is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam and the UE receive beam), which may be further refined and maintained in accordance with one or more established beam refinement procedures.

A downlink beam may be associated with a transmission configuration indicator (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each NN transmit beam may be associated with an SSB, and the UE 120 may indicate a preferred NN transmit beam by transmitting uplink transmissions in resources of the SSB that are associated with the preferred NN transmit beam. A particular SSB may have an associated TCI state (for example, for an antenna port or for beamforming). The network node 110 may, in some examples, indicate a downlink NN transmit beam based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam at the UE 120. Thus, the UE 120 may select a corresponding UE receive beam from a set of BPLs based at least in part on the network node 110 indicating an NN transmit beam via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a physical downlink shared channel (PDSCH). The set of activated TCI states for downlink control channel communications may correspond to beams that the network node 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams.

The network node 110 may receive uplink transmissions via one or more NN receive beams (e.g., NN receive beams). The network node 110 may identify a particular UE transmit beam and a particular NN receive beam that provide relatively favorable performance (for example, that have a best channel quality of the different measured combinations of UE transmit beams and NN receive beams). In some examples, the network node 110 may transmit an indication of which UE transmit beam is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam and the NN receive beam), which may be further refined and maintained in accordance with one or more established beam refinement procedures. An uplink beam, such as a UE transmit beam or an NN receive beam, may be associated with a spatial relation. A spatial relation may indicate a directionality or a characteristic of the uplink beam, similar to one or more QCL properties, as described above.

A TCI state may include two resources (e.g., RS1, RS2), where RS1 is for QCL Type-A/B/C, while RS2 is for QCL Type-D (spatial relation). A TCI state resource may include an SSB or a tracking reference signal (TRS). There may be a TCI state for each of N SSBs, or each of N TRSs. There may be a one-to-one mapping between an SSB and a TRS. There may be a total of 2N TCI states.

Within each SSB/TRS (wide beam), there may be K narrow beams, each represented by a CSI-RS. For example, for the ith TRS, there are K narrow beams, represented by CSI-RS[i][k], k=1, 2 . . . . K. Accordingly, a TCI state may be represented as (TRS[i], CSI-RS[i][k]). In total, there may be KN TCI states to define TCI states for narrow beams and thus a total quantity of TCI states may be 2N+KN=(K+2)N. For example, if N=12 and K=12, the total quantity of TCI states may be (12+2)12=168 TCI states. This is much larger than the 128 TCI states that are allowed.

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
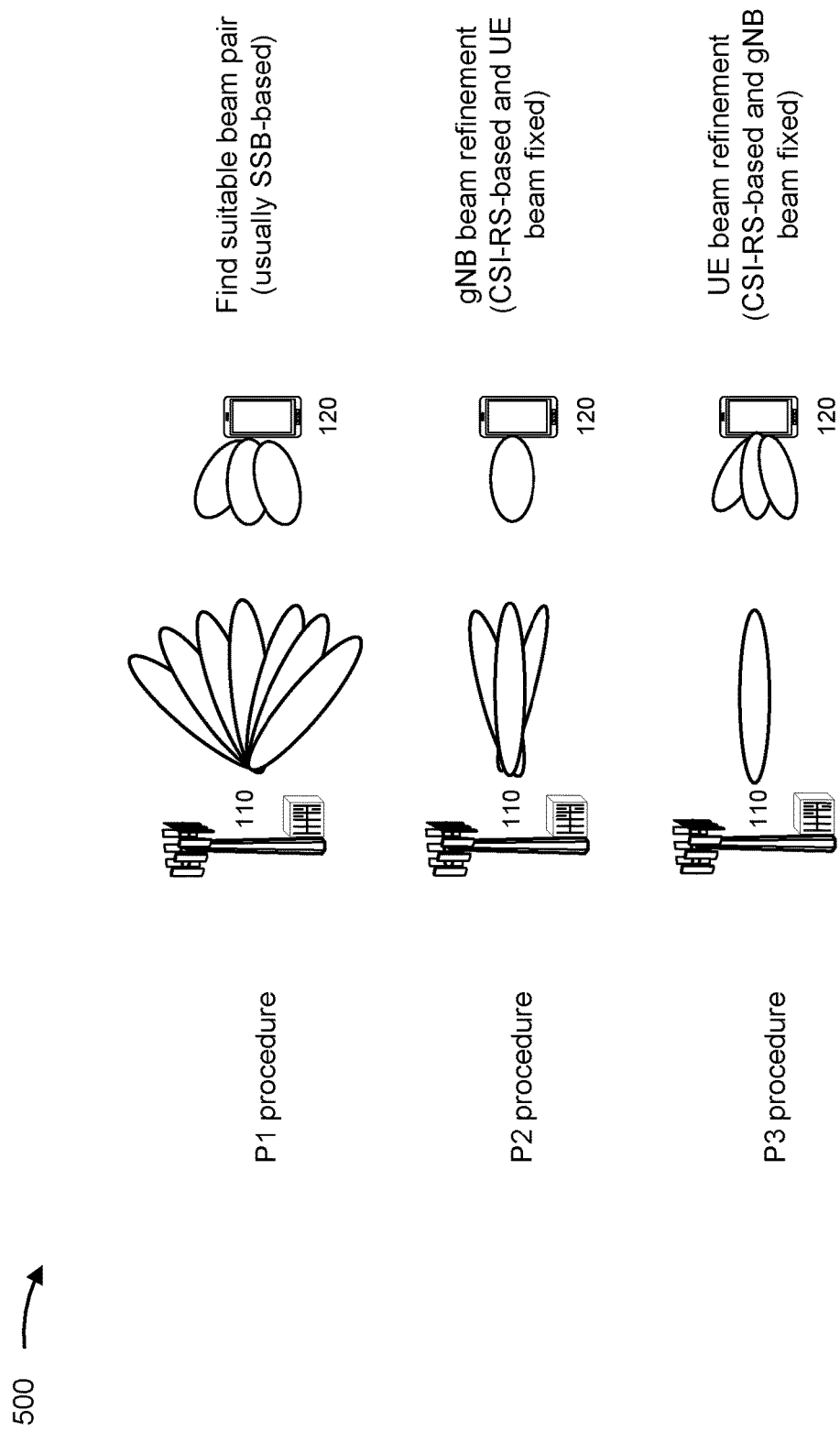
FIG. 5 is a diagram illustrating an example of beam management procedures, in accordance with the present disclosure.

FIG. 5 is a diagram illustrating an example 500 of beam management procedures, in accordance with the present disclosure. While example 400 of FIG. 4 describes an example of P1, P2, and P3 procedures, these procedures are summarized here to highlight some issues with such procedures.

P1, P2 and P3 procedures are for beam management flows. For a P1 procedure, which is usually SSB-based, a suitable beam pair is determined (gNB Tx beam, UE Rx beam). For a P2 procedure, which is CSI-RS based with 1 or 2 ports, gNB beam refinement is performed with a fixed UE beam. Beam refinement involves finding an optimal beam narrow beam among multiple candidate narrow beams. For a P3 procedure, which is also CSI-RS based with 1 or 2 ports, UE beam refinement is performed with a fixed gNB beam.

A TCI state may be defined for a CSI-RS in a P2 procedure such that the gNB can signal a narrow beam to the UE for a P3 procedure and for other channels. Information about the narrow beam can help the UE to better perform beam management. When the P2 procedure uses an aperiodic CSI-RS (AP-CSI-RS), it is difficult to define a TCI state for the AP-CSI-RS without significantly increasing the total quantity of TCI states, which is limited to 128. If one TCI state is defined for each narrow beam uniquely, the total quantity of TCI states may significantly surpass this limit.

In scenarios where no TCI state is defined with a P2 procedure, a UE does not know which narrow beam is used by the gNB for downlink (DL) and uplink (UL). The UE only knows the gNB beam at the SSB level, or the wide beam level. Without information about the narrow beams used by the gNB, the UE cannot optimally select beams in a P3 procedure or other beam operations. If optimal beams are not selected, communications may degrade, which wastes time, power, processing resources, and signaling resources.

As indicated above, FIG. 5 is provided as an example. Other examples may differ from what is described with regard to FIG. 5.

Figure 6:
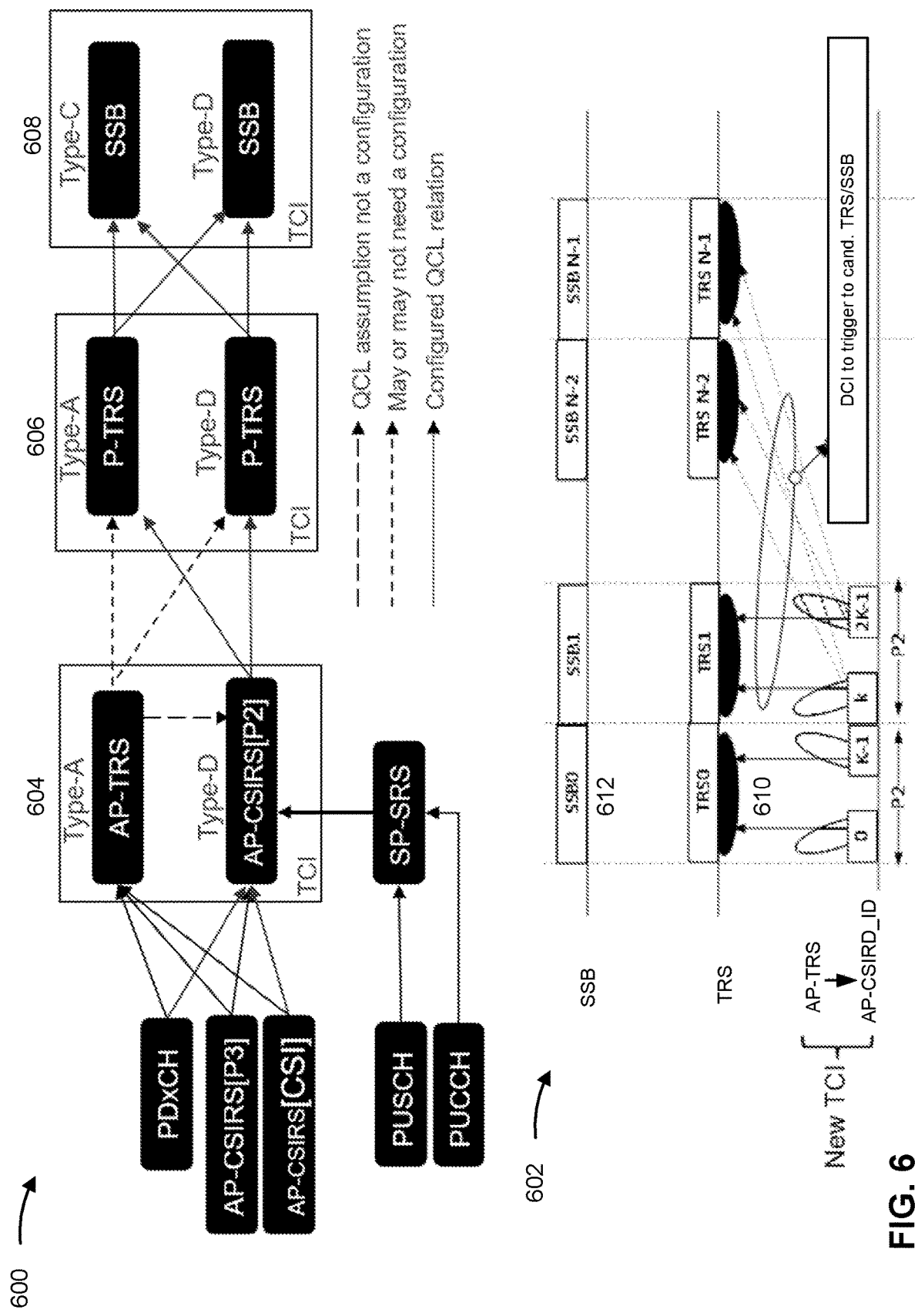
FIG. 6 is a diagram illustrating an example of transmission configuration indicator (TCI) states for an aperiodic CSI-RS (AP-CSI-RS), in accordance with the present disclosure.

FIG. 6 is a diagram illustrating an example 600 of TCI states for an AP-CSI-RS, in accordance with the present disclosure.

According to various aspects described herein, TCI states may be defined for AP-CSI-RSs in a dynamic way that is based at least in part on a triggered CSI-RS (CSI-RS) and its QCL Type-D resource. The QCL Type-D resource may be a TRS (identified by a TRS identifier (ID)) or an SSB (identified by an SSB ID). A network entity (e.g., a gNB) may transmit a configuration that configures TCI states based at least in part on AP-CSI-RSs, where each TCI state 604 includes a pair of resources that includes a first resource that is an AP-TRS and a second resource that is an AP-CSI-RS. Note that each reference resource signal SSB, TRS, or AP-CSI-RS may be identified by a respective ID, such as an SSB ID, an TRS ID or an AP-CSI-RS ID, which may be used interchangeably with the respective resource.

For example, {(AP-TRS[1], AP-CSI-RS ID[1]), (AP-TRS [1], AP-CSI-RS ID[2]), . . . , (AP-TRS[1]. AP-CSI-RS ID[K])} represent K TCI states, corresponding to a first P2 procedure, and {(AP-TRS[2], AP-CSI-RS ID[K+1]), (AP-TRS[2], AP-CSI-RS ID[K+2]), . . . , (AP-TRS[2], AP-CSI-RS ID[K+K])} represent K TCI states corresponding to a second P2 procedure. For each P2 procedure, a set of trigger states is defined, where each trigger state is associated with a particular SSB-ID. For a pair (AP-CSI-RS ID, SSB-ID), where SSB-ID represents the QCL source of an AP-CSI-RS when the AP-CSI-RS resource set for the AP-CSI-RS is triggered by DCI, the combination of the AP-CSI-RS ID and the associated QCL Type-D resource may uniquely indicate a first narrow beam. The network entity and the UE may transmit or receive a reference signal using a TCI state that corresponds to the narrow beam. In this way, the total quantity of TCI states is significantly reduced.

Example 600 shows TCI states for an AP-CSI-RS, where each TCI state 604 includes two reference signals that are a pair of (SSB, SSB), a pair of (P-TRS, P-TRS), or pair of (AP-TRS, AP-CSI-RS). Each P-TRS may be configured with its QCL sources represented by a TCI state 608 (SSB, SSB), and each AP-CSI-RS or AP-TRS may be configured with QCL sources represented by a TCI state 606 (P-TRS, P-TRS). A QCL relation may be represented by arrows, where the arrow starts from a target resource and points to a QCL resource or reference. A long dashed line represents a QCL relation that may be an assumption but not a configuration, while a short dashed line represents QCL resources that may or may not need to be configured. Each downlink channel or signal (PDCCH, PDSCH, CSI-RS) has a QCL source represented by a TCI state 604 with resources (AP-TRS, AP-CSI-RS), which can further be QCLed to a P-TRS and an SSB along the arrows of QCL chains as shown in example 600. An uplink channel or signal may directly (e.g., via a semi-persistent sounding reference signal (SP-SRS)) or indirectly (e.g., physical uplink shared channel (PUSCH) or physical uplink control channel (PUCCH)) QCLed to an AP-CSI-RS that is further QCLed to a P-TRS and an SSB along the arrows of QCL chains.

Example 600 shows that each AP-CSI-RS ID[P2] may be unique within the P-TRS ID of the TCI state associated with a DCI-trigger state. Each AP-CSI-RS ID and its QCL source P-TRS ID can uniquely identify a narrow beam globally at the time the AP-CSI-RS is triggered by DCI. The TCI state may be defined by the AP-CSI-RS ID and thus may identify a narrow beam globally and temporarily at the time the AP-CSI-RS is triggered.

In an example, if N=2 AP-TRS IDs are defined, where each AP-TRS ID is linked to one P2 procedure of K AP-CSI-RS IDs, a TCI state may be (AP-TRS ID:A, AP-CSI-RS ID(P2):D). The total extra quantity of TCI states may be NxK for a deployment. This assumes that there are 12 AP-CSI-RSs under one TRS/SSB wide beam. Example 602 shows that N=2 AP-TRS IDs 610 may correspond to N SSBs 612.

The TCI states may form two subgroups: one group under a current serving SSB/TRS and another group under a candidate SSB/TRS gNB plan. There may be switching between the two subgroups of TCI states. If AP-TRS is not triggered (e.g., the AP-TRS is QCL-float), the UE may obtain the TRS (P-TRS)/SSB for Type-A/C through the QCL relation (a physical downlink channel to (Type-D) AP-CSI-RS to (Type-A) TRS to (Type-C) SSB). The AP-TRS may effectively be a float TRS that follows AP-CSI-RS[P2]. When AP-TRS is triggered, the AP-TRS may be triggered the same as P-TRS that is the QCL source of AP-CSI-RS[P2].

The UE may use the ID pair (TRS ID/SSB-ID, AP-CSI-RS ID[k]) to identify a particular narrow beam within the wide beam associated with TRS ID/SSB-ID. The UE may update the SSB-ID when the same P2 procedure is triggered to a different TRS ID/SSB-ID. It is expected that the network entity may send a P3 procedure for the UE to train the best UE beam for a selected set of TCI states (each is a gNB narrow beam). The UE may obtain the best UE beam for each of the trained TCI states. Based on the above understanding, when the network entity uses a TCI state defined above to signal a QCL relationship to the UE for a particular signal or channel, the UE may select the respective optimal UE beam to receive or transmit a reference signal or other signal for communication. When the network entity uses DCI to trigger an AP-CSI-RS resource set, the DCI may also effectively trigger a QCL relationship between an AP-CSI-RS ID and another TCI state with a QCL Type-D resource that is a TRS with a QCL Type-D resource that is associated with an SSB ID (TRS QCLed to an SSB).

By defining TCI states based at least in part on AP-CSI-RS IDs, a quantity of TCI states that are needed to signal a narrow beam is reduced or minimized, which can reduce signaling overhead and resources. By defining TCI states this way, the identification of narrow beams can be more accurate (for more accurate beam management), because the UE knows which narrow beam is used.

Each AP-CSI-RS ID[P2] may be unique within the P-TRS ID of the TCI associated with a DCI-trigger state. Each AP-CSI-RS ID and its associated QCL Type-D resource (e.g., SSB ID. TRS ID, P-TRS ID) can uniquely identify a narrow beam globally at the time it is triggered by the DCI. TCI states may be defined based on AP-CSI-RS IDs to identify narrow beams globally and temporarily at the time that an AP-CSI-RS resource set for the AP-CSI-RS ID is triggered by the DCI.

As indicated above, FIG. 6 is provided as an example. Other examples may differ from what is described with regard to FIG. 6.

Figure 7:
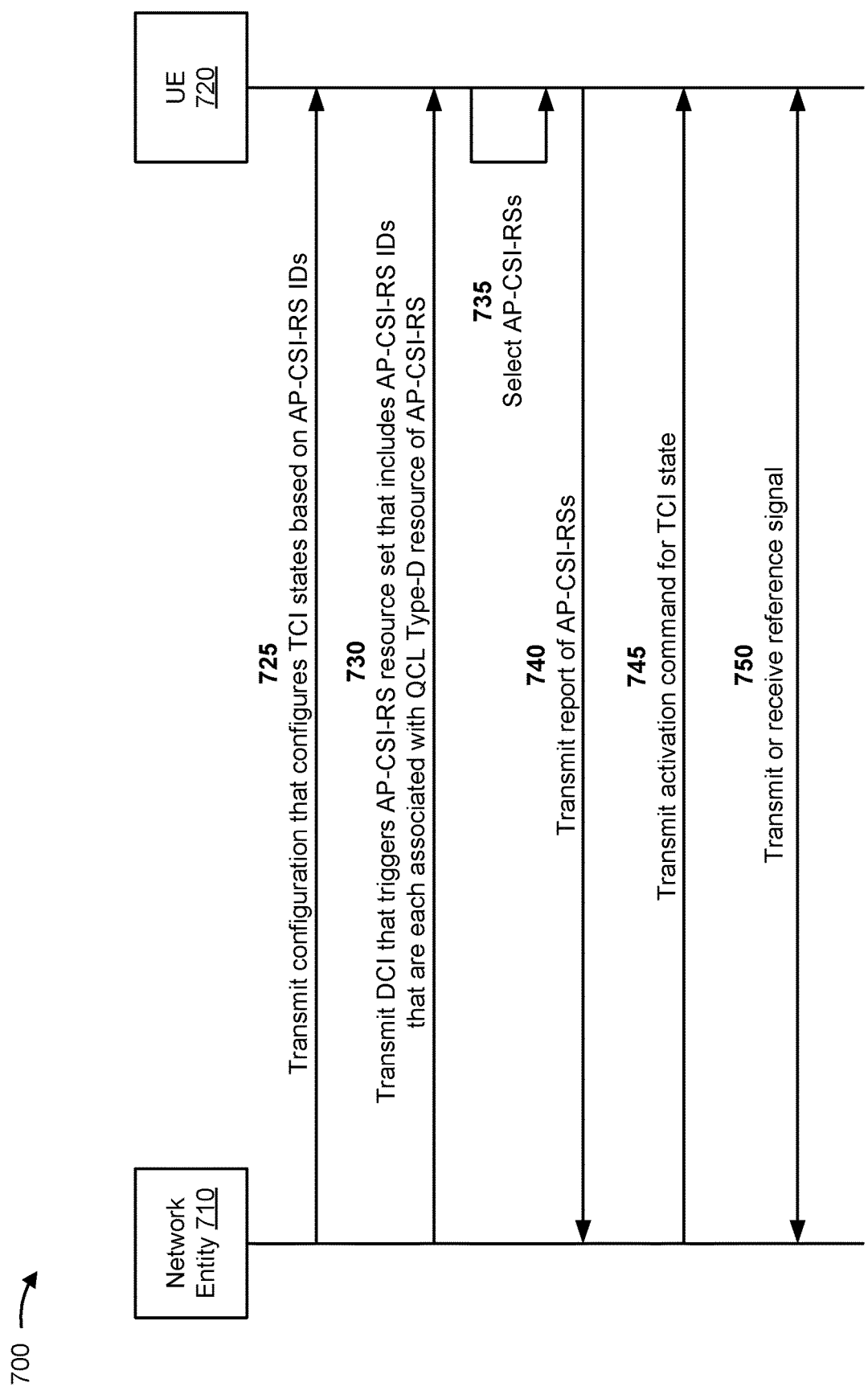
FIG. 7 is a diagram illustrating an example associated with defining TCI states based on AP-CSI-RS identifiers, in accordance with the present disclosure.

FIG. 7 is a diagram illustrating an example 700 associated with defining TCI states based on AP-CSI-RS IDs, in accordance with the present disclosure. As shown in FIG. 7, a network entity 710 (e.g., network node 110) and a UE 720 (e.g., UE 120) may communicate with one another via a wireless network (e.g., wireless network 100).

As shown by reference number 725, the network entity 710 may transmit a configuration that configures TCI states based at least in part on AP-CSI-RS IDs. As shown by reference number 730, the network entity 710 may transmit DCI that triggers an AP-CSI-RS resource set that includes AP-CSI-RS IDs that are each associated with a QCL Type-D resource of an AP-CSI-RS. The QCL Type-D resource may be a TRS or an SSB. A combination of an AP-CSI-RS and an associated QCL Type-D resource may uniquely indicate a narrow beam.

The UE 720 may measure AP-CSI-RSs as part of a P2 (beam refinement) procedure to select top beam candidates. As shown by reference number 735, the UE 720 may select the top AP-CSI-RSs based at least in part on the measurements (e.g., highest Layer 1 (L1) RSRP measurements). As shown by reference number 740, the UE 720 may transmit a report of the top AP-CSI-RSs.

The network entity 710 may select an AP-CSI-RS from among the top AP-CSI-RSs that were reported by the UE 720. The network entity 710 may select the AP-CSI-RS based at least in part on channel conditions, traffic conditions, beam information, and or capability information. The network entity 710 may select the AP-CSI-RS ID that corresponds to the best (e.g., highest) RSRP to determine the TCI state to activate, where the TCI state is defined by the AP-CSI-RS ID. As shown by reference number 745, the network entity 710 may transmit an activation command to activate the TCI state. In some aspects, the network entity 710 may use the combination of the AP-CSI-RS (triggered by its AP-CSI-RS resource set) and its associated QCL Type-D resource (TRS or SSB) to select the narrow beam. The narrow beam may correspond to a TCI state that can be identified by a pair of the AP-CSI-RS and the TRS.

The UE 720 may activate the TCI state associated with a selected narrow beam associated with a triggered AP-CSI-RS. For transmissions of a reference signal (e.g., SRS), the UE 720 may select a transmit beam that matches a receive beam of the network entity 710. For receptions of a reference signal (e.g., receiving CSI-RSs), the UE 720 may select a receive beam that matches a transmit beam of the network entity 710. As shown by reference number 750, the network entity 710 and the UE 720 may transmit or receive a reference signal using the narrow beam, or more specifically, using a TCI state that corresponds to the narrow beam. By defining TCI states based on AP-CSI-RS IDs, the quantity of TCI states may not exceed a specified maximum quantity of TCI states (e.g., 128 TCI states). As a result, processing resources and signaling resources may be conserved when selecting beams associated with beam refinement (e.g., P2 procedure, P3 procedure).

As indicated above, FIG. 7 is provided as an example. Other examples may differ from what is described with respect to FIG. 7.

Figure 8:
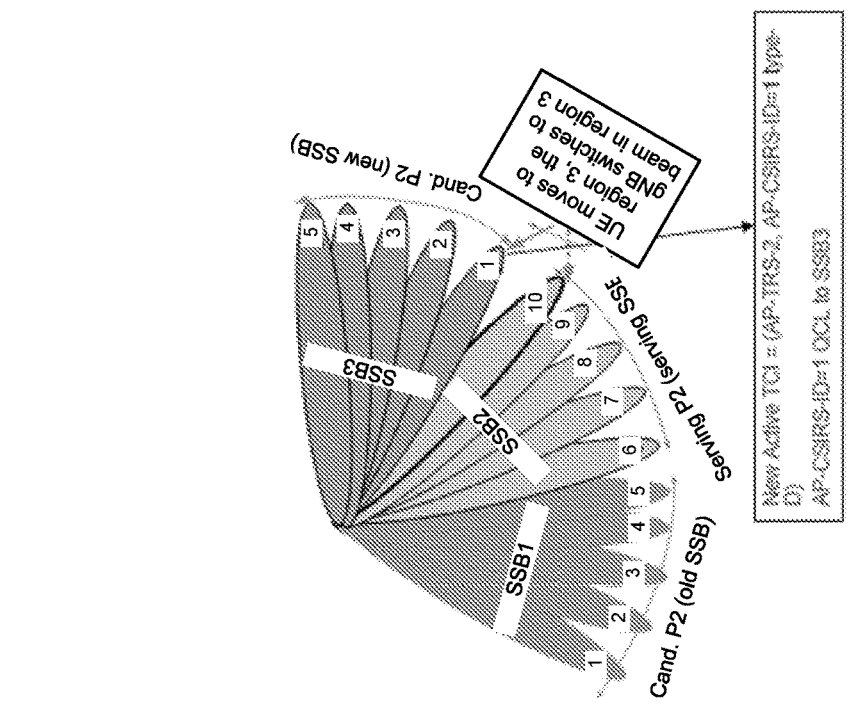
FIG. 8 is a diagram illustrating an example of beam selection with two resource sets, in accordance with the present disclosure.
Figure 8:
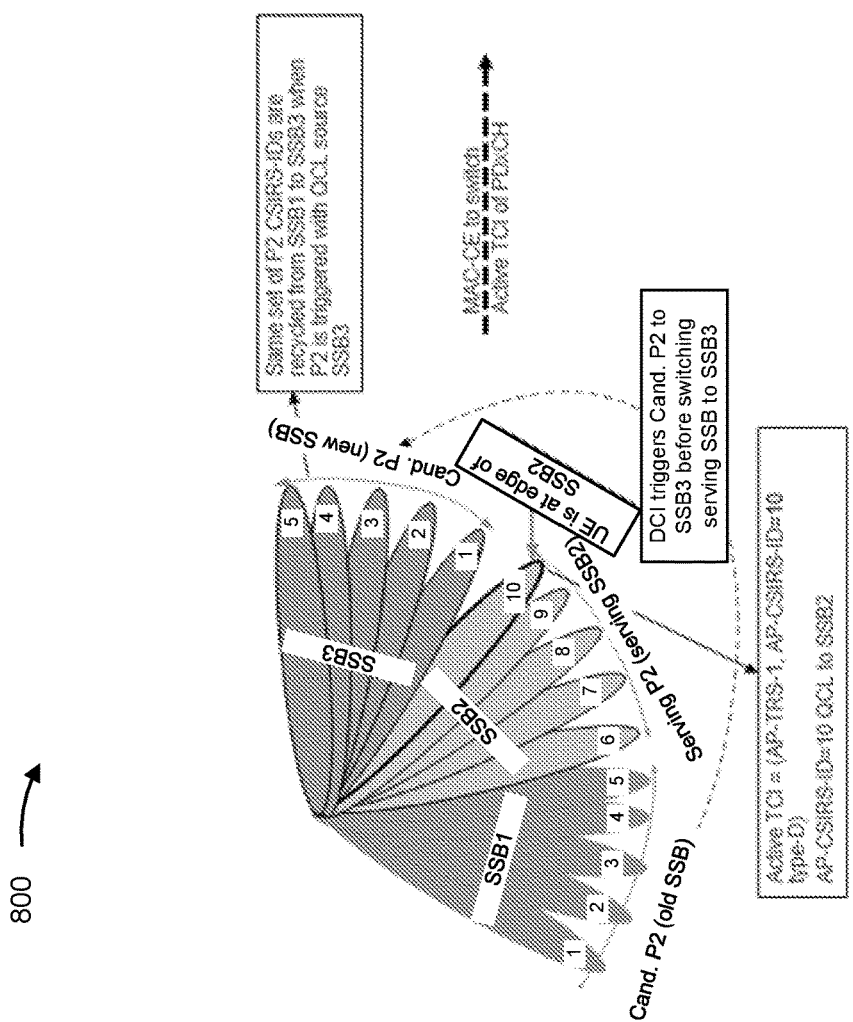

FIG. 8 is a diagram illustrating an example 800 of beam selection with two resource sets, in accordance with the present disclosure.

An AP-CSI-RS[P2] that is triggered by DCI can be used as a QCL resource for other channels/signals after the DCI triggering. This may be instantaneous when the AP-CSI-RS ID is triggered. In some aspects, when the same AP-CSI-RS[P2] is triggered again, the AP-CSI-RS may be associated with the same SSB/TRS. Therefore, the same AP-CSI-RS ID may correspond to the same narrow beam. Alternatively, in some aspects, when the same AP-CSI-RS[P2] is triggered again, the AP-CSI-RS may be associated with a different SSB/TRS. Therefore, the same AP-CSI-RS ID may represent a different narrow beam. Such a change of the narrow beam for the same AP-CSI-RS ID is instantaneous upon the triggered AP-CSI-RS being received by the UE. To resolve this issue associated with such an instantaneous action time of the QCL represented by the AP-CSI-RS, two P2 procedures may be used. One P2 procedure may be used to indicate a narrow beam for current traffic (serving P2). The other P2 procedure may be used to move from one SSB/TRS region to another SSB/TRS region (candidate P2 or "Cand.P2"). In this way, the beam indication of a serving P2 will not be impacted when the network entity tries a new narrow beam in a new SSB/TRS region other than the current serving SSB/TRS region. The operation involving two P2 procedures may be referred to a "ping-pong operation of two P2 resource sets."

Example 800 shows a first P2 resource set 802 for a current serving SSB (serving P2, second region) and a second P2 resource set 804 (candidate P2). As the UE moves to the edge of the current SSB region, DCI may trigger the candidate P2 to a new SSB region (region 3). Once the new region is verified (may following P3/CSI-RS procedures), the network entity may transmit a MAC CE to switch the UE narrow beam to one of the P2 beams within region 3. The AP-CSI-RS ID[P2} and the triggered SSB-ID can uniquely identify a narrow beam globally.

In example 800, 5 CSI-RSs are within one P2 (for one SSB), ID={1,2,3,4,5} under one P2, P2-1, and ID={6,7,8, 9,10} under the second P2, P2-2. There may be two TRSs (TRS-1, TRS-2) and 10 TCI states, 5 for each P2: 5 TCI states for P2-1 with TRS-1. CSI-RS ID[i], i=1, . . . , 5 and 5 TCI states for P2-2 with TRS-1, CSI-RS ID[i], i=6, . . . , 10.

As indicated above, FIG. 8 is provided as an example. Other examples may differ from what is described with regard to FIG. 8.

Figure 9:
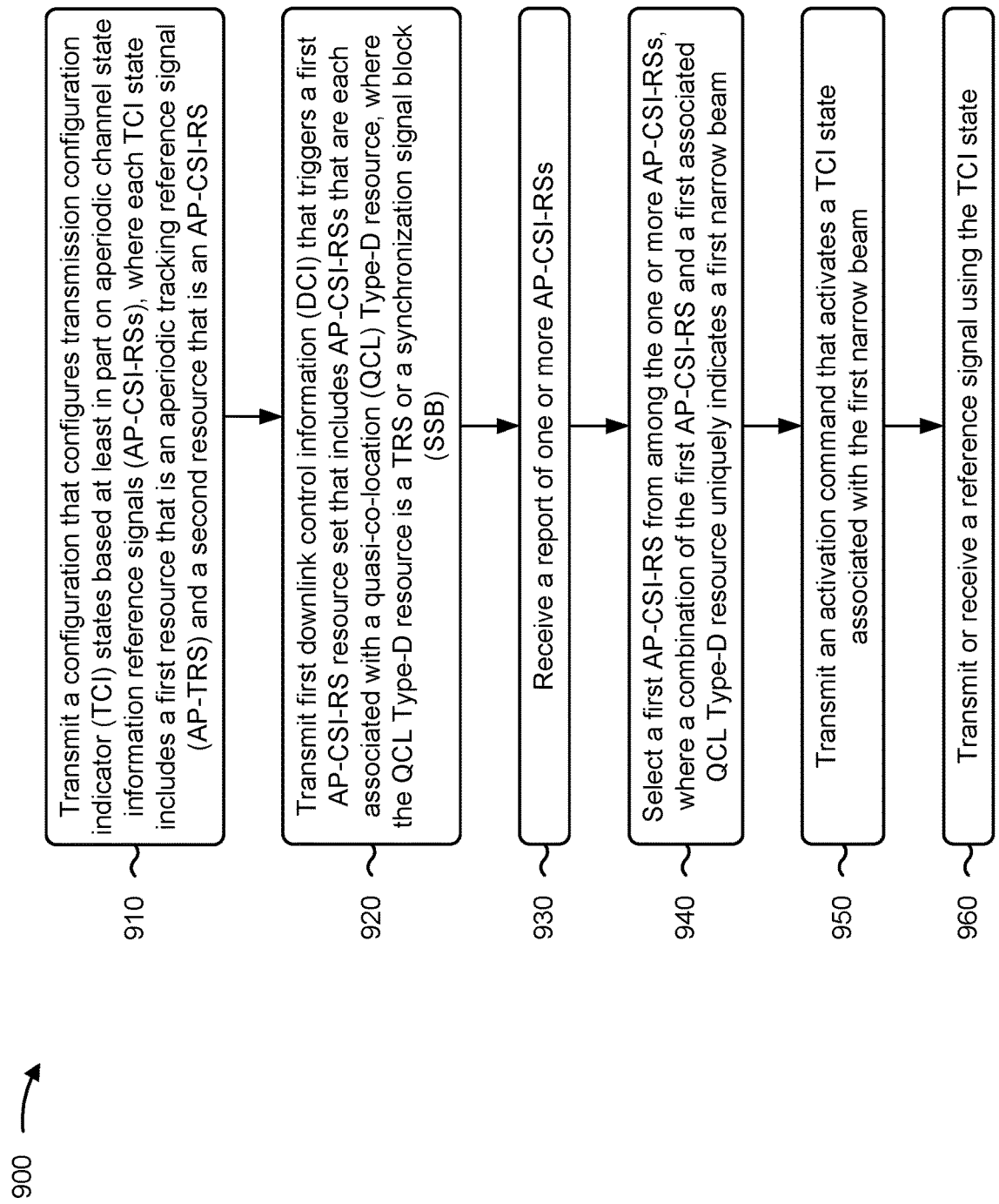
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., network node 110, network entity 710) performs operations associated with defining TCI states based on AP-CSI-RS IDs.

As shown in FIG. 9, in some aspects, process 900 may include transmitting a configuration that configures TCI states based at least in part on AP-CSI-RSs, where each TCI state includes a first resource that is an AP-TRS and a second resource that is an AP-CSI-RS (block 910). For example, the network entity (e.g., using transmission component 1104 and/or communication manager 1106 depicted in FIG. 11) may transmit a configuration that configures TCI states based at least in part on AP-CSI-RSs, where each TCI state includes a first resource that is an AP-TRS and a second resource that is an AP-CSI-RS, as described above.

As further shown in FIG. 9, in some aspects, process 900 may include transmitting first DCI that triggers a first AP-CSI-RS resource set that includes AP-CSI-RSs that are each associated with a QCL Type-D resource, where the QCL Type-D resource is a TRS or an SSB (block 920). For example, the network entity (e.g., using transmission component 1104 and/or communication manager 1106 depicted in FIG. 11) may transmit first DCI that triggers a first AP-CSI-RS resource set that includes AP-CSI-RSs that are each associated with a QCL Type-D resource, where the QCL Type-D resource is a TRS or an SSB, as described above.

As further shown in FIG. 9, in some aspects, process 900 may include receiving a report of one or more AP-CSI-RSs (block 930). For example, the network entity (e.g., using reception component 1102 and/or communication manager 1106 depicted in FIG. 11) may receive a report of one or more AP-CSI-RSs, as described above.

As further shown in FIG. 9, in some aspects, process 900 may include selecting a first AP-CSI-RS from among the one or more AP-CSI-RSs, where a combination of the first AP-CSI-RS and a first associated QCL Type-D resource uniquely indicates a first narrow beam (block 940). For example, the network entity (e.g., using communication manager 1106 depicted in FIG. 11) may select a first AP-CSI-RS from among the one or more AP-CSI-RSs, where a combination of the first AP-CSI-RS and a first associated QCL Type-D resource uniquely indicates a first narrow beam, as described above.

As further shown in FIG. 9, in some aspects, process 900 may include transmitting an activation command that activates a TCI state associated with the first narrow beam (block 950). For example, the network entity (e.g., using transmission component 1104 and/or communication manager 1106 depicted in FIG. 11) may transmit an activation command that activates a TCI state associated with the first narrow beam, as described above.

Figure 11:
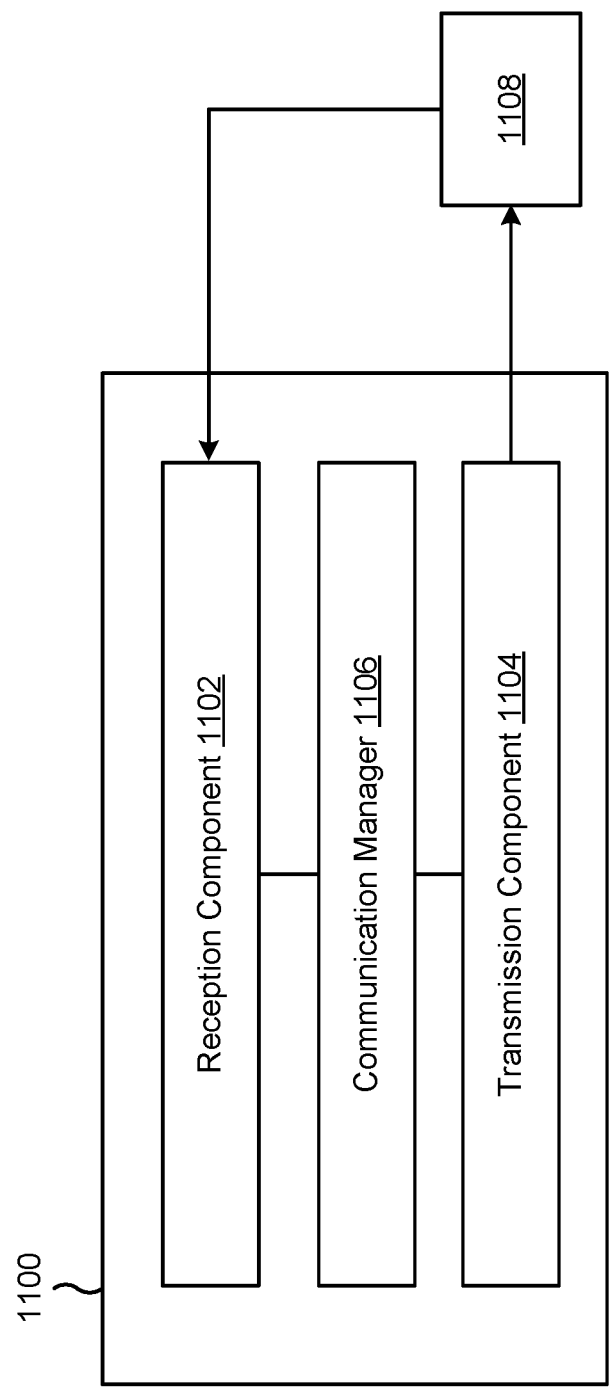
FIG. 11 is a diagram of an example apparatus for wireless communication, in accordance with the present disclosure.

As further shown in FIG. 9, in some aspects, process 900 may include transmitting or receiving a reference signal using the TCI state (block 960). For example, the network entity (e.g., using transmission component 1104 and/or communication manager 1106 depicted in FIG. 11 depicted in FIG. 11) may transmit or receive a reference signal using the TCI state, as described above.

Process 900 may include additional aspects, such as any single aspect or any combination of aspects described below and/or in connection with one or more other processes described elsewhere herein.

In a first aspect, process 900 includes transmitting second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with the first associated QCL Type-D resource, and transmitting or receiving a second reference signal using the first narrow beam.

In a second aspect, alone or in combination with the first aspect, process 900 includes transmitting second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with a second associated QCL Type-D resource that is different than the first associated QCL Type-D resource, and transmitting or receiving a second reference signal using a second narrow beam that is different than the first narrow beam.

In some aspects, based at least in part on an AP-TRS associated with the TRS being transmitted and configured with a QCL Type-D resource and a QCL Type-A resource, the TRS is based at least in part on the QCL Type-D resource and the QCL Type-A resource configured for the AP-TRS.

In some aspects, based at least in part on an AP-TRS associated with the TRS being transmitted and not being configured with a QCL Type-D resource and a QCL Type-A resource, the TRS (or AP-TRS) is based at least in part on the first associated QCL Type-D resource of the AP-CSI-RS and a first associated QCL Type-A resource of the AP-CSI-RS.

In some aspects, based at least in part on an AP-TRS associated with the TRS not being transmitted and not being configured with a QCL Type-D resource, the TRS (or AP-TRS) is based at least in part on the first associated QCL Type-D resource of the AP-CSI-RS and a first associated QCL Type-A resource of the AP-CSI-RS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
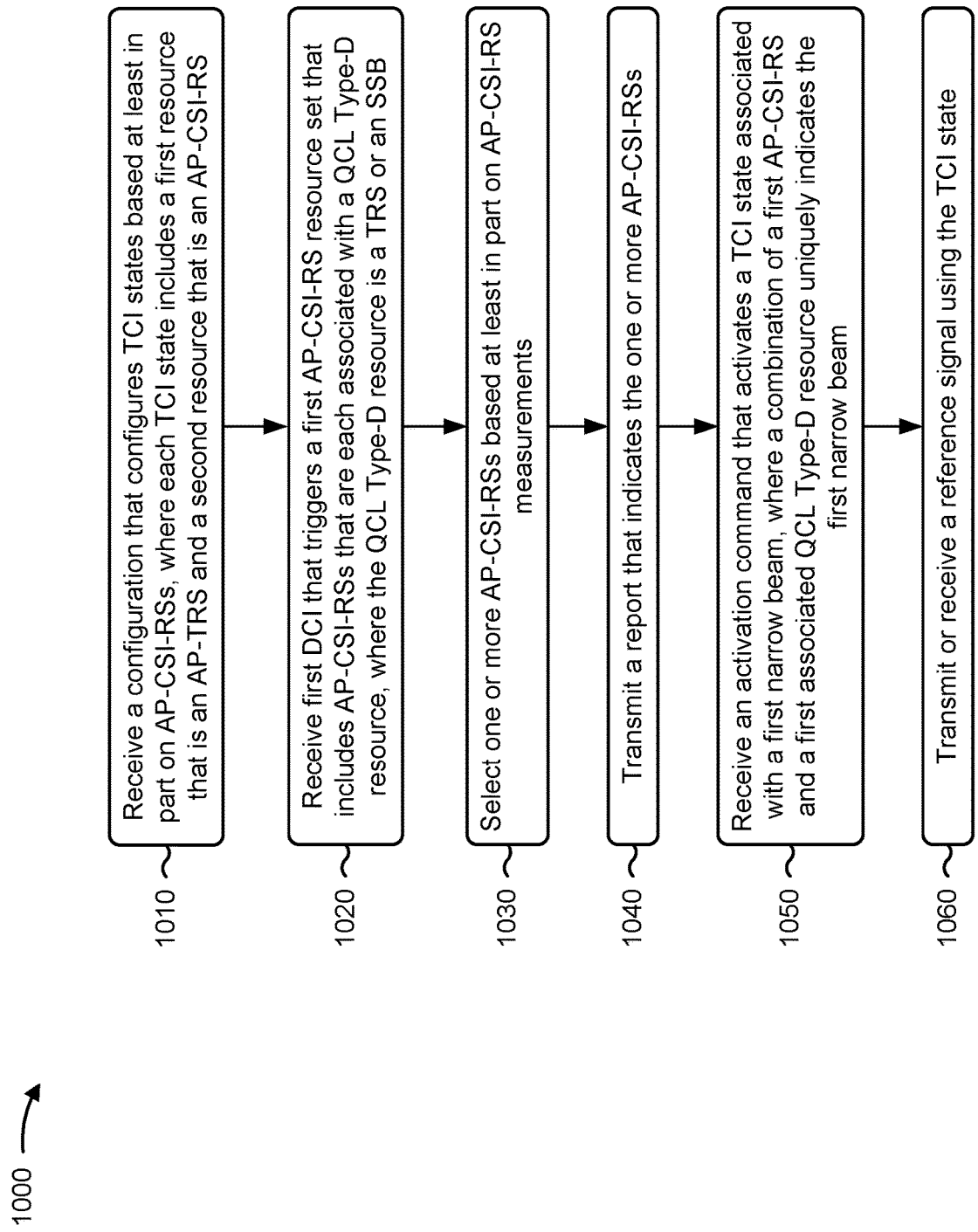
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120, UE 720) performs operations associated with indicating a TCI state that is based on an AP-CSI-RS.

As shown in FIG. 10, in some aspects, process 1000 may include receiving a configuration that configures TCI states based at least in part on AP-CSI-RSs, where each TCI state includes a first resource that is an AP-TRS and a second resource that is an AP-CSI-RS (block 1010). For example, the UE (e.g., using reception component 1202 and/or communication manager 1206, depicted in FIG. 12) may receive a configuration that configures TCI states based at least in part on AP-CSI-RSs, where each TCI state includes a first resource that is an AP-TRS and a second resource that is an AP-CSI-RS, as described above.

As further shown in FIG. 10, in some aspects, process 1000 may include receiving first DCI that triggers a first AP-CSI-RS resource set that includes AP-CSI-RSs that are each associated with a QCL Type-D resource, where the QCL Type-D resource is a TRS or an SSB (block 1020). For example, the UE (e.g., using reception component 1202 and/or communication manager 1206, depicted in FIG. 12) may receive first DCI that triggers a first AP-CSI-RS resource set that includes AP-CSI-RSs that are each associated with a QCL Type-D resource, where the QCL Type-D resource is a TRS or an SSB, as described above.

As further shown in FIG. 10, in some aspects, process 1000 may include selecting one or more AP-CSI-RSs based at least in part on AP-CSI-RS measurements (block 1030). For example, the UE (e.g., using communication manager 1206, depicted in FIG. 12) may select one or more AP-CSI-RSs based at least in part on AP-CSI-RS measurements, as described above.

As further shown in FIG. 10, in some aspects, process 1000 may include transmitting a report that indicates the one or more AP-CSI-RSs (block 1040). For example, the UE (e.g., using transmission component 1204 and/or communication manager 1206, depicted in FIG. 12) may transmit a report that indicates the one or more AP-CSI-RSs, as described above.

As further shown in FIG. 10, in some aspects, process 1000 may include receiving an activation command that activates a TCI state associated with a first narrow beam, where a combination of a first AP-CSI-RS and a first associated QCL Type-D resource uniquely indicates the first narrow beam (block 1050). For example, the UE (e.g., using reception component 1202 and/or communication manager 1206, depicted in FIG. 12) may receive an activation command that activates a TCI state associated with a first narrow beam, where a combination of a first AP-CSI-RS and a first associated QCL Type-D resource uniquely indicates the first narrow beam, as described above.

As further shown in FIG. 10, in some aspects, process 1000 may include transmitting or receiving a reference signal using the TCI state (block 1060). For example, the UE (e.g., using transmission component 1204 and/or communication manager 1206, depicted in FIG. 12) may transmit or receive a reference signal using the TCI state, as described above.

Process 1000 may include additional aspects, such as any single aspect or any combination of aspects described below and/or in connection with one or more other processes described elsewhere herein.

In a first aspect, process 1000 includes receiving second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with the first associated QCL Type-D resource, and transmitting or receiving a second reference signal using the first narrow beam.

In a second aspect, alone or in combination with the first aspect, process 1000 includes receiving second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with a second associated QCL Type-D resource that is different than the first associated QCL Type-D resource, and transmitting or receiving a second reference signal using a second narrow beam that is different than the first narrow beam.

In a third aspect, alone or in combination with one or more of the first and second aspects, the transmitting the reference signal includes selecting a transmit beam that matches a receive beam of a network entity.

In a fourth aspect, alone or in combination with one or more of the first through third aspects, the receiving the reference signal includes selecting a receive beam that matches a transmit beam of a network entity.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication, in accordance with the present disclosure. The apparatus 1100 may be a network entity, or a network entity may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 1106 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 1-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network entity described in connection with FIG. 2. In some aspects, the transmission component 1104 may be co-located with the reception component 1102 in a transceiver.

The transmission component 1104 may transmit a configuration that configures TCI states based at least in part on AP-CSI-RSs, where each TCI state includes a first resource that is an AP-TRS and a second resource that is an AP-CSI-RS. The transmission component 1104 may transmit first DCI that triggers a first AP-CSI-RS resource set that includes AP-CSI-RSs that are each associated with a QCL Type-D resource, where the QCL Type-D resource is a TRS or an SSB. The reception component 1102 may receive a report of one or more AP-CSI-RSs. The communication manager 1106 may select a first AP-CSI-RS from among the one or more AP-CSI-RSs, where a combination of the first AP-CSI-RS and a first associated QCL Type-D resource uniquely indicates a first narrow beam. The transmission component 1104 may transmit an activation command that activates a TCI state associated with the first narrow beam. The transmission component 1104 may transmit or receive a reference signal using the TCI state.

The transmission component 1104 may transmit second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with the first associated QCL Type-D resource.

The transmission component 1104 may transmit or receive a second reference signal using the first narrow beam.

The transmission component 1104 may transmit second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with a second associated QCL Type-D resource that is different than the first associated QCL Type-D resource.

The transmission component 1104 may transmit or receive a second reference signal using a second narrow beam that is different than the first narrow beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
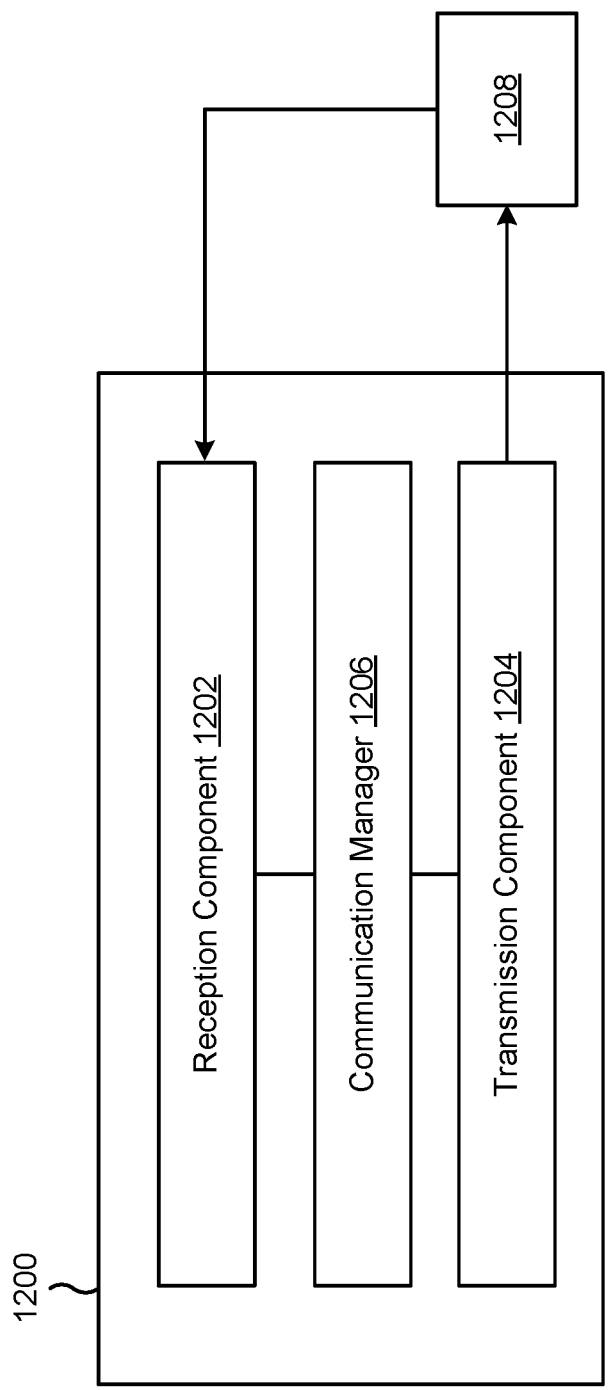
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a configuration that configures TCI states based at least in part on AP-CSI-RSs, where each TCI state includes a first resource that is an AP-TRS and a second resource that is an AP-CSI-RS. The reception component 1202 may receive first DCI that triggers a first AP-CSI-RS resource set that includes AP-CSI-RSs that are each associated with a QCL Type-D resource, where the QCL Type-D resource is a TRS or a synchronization signal block (SSB). The communication manager 1206 may select one or more AP-CSI-RSs based at least in part on AP-CSI-RS measurements. The transmission component 1204 may transmit a report that indicates the one or more AP-CSI-RSs. The reception component 1202 may receive an activation command that activates a TCI state associated with a first narrow beam, where a combination of a first AP-CSI-RS and a first associated QCL Type-D resource uniquely indicates the first narrow beam. The transmission component 1204 may transmit or receive a reference signal using the TCI state.

The reception component 1202 may receive second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with the first associated QCL Type-D resource.

The transmission component 1204 may transmit or receive a second reference signal using the first narrow beam.

The reception component 1202 may receive second DCI that triggers the AP-CSI-RS resource set, where a second AP-CSI-RS associated with the second DCI and the first AP-CSI-RS associated with the first DCI are a same AP-CSI-RS, and the second AP-CSI-RS is associated with a second associated QCL Type-D resource that is different than the first associated QCL Type-D resource.

The transmission component 1204 may transmit or receive a second reference signal using a second narrow beam that is different than the first narrow beam.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network entity, comprising: transmitting a configuration that configures transmission configuration indicator (TCI) states based at least in part on aperiodic channel state information reference signals (AP-CSI-RSs), wherein each TCI state includes a first resource that is an aperiodic tracking reference signal (AP-TRS) and a second resource that is an AP-CSI-RS; transmitting first downlink control information (DCI) that triggers a first AP-CSI-RS resource set that includes AP-CSI-RSs that are each associated with a quasi-co-location (QCL) Type-D resource, wherein the QCL Type-D resource is a TRS or a synchronization signal block (SSB); receiving a report of one or more AP-CSI-RSs; selecting a first AP-CSI-RS from among the one or more AP-CSI-RSs, wherein a combination of the first AP-CSI-RS and a first associated QCL Type-D resource uniquely indicates a first narrow beam; transmitting an activation command that activates a TCI state associated with the first narrow beam; and transmitting or receiving a reference signal using the TCI state.

Aspect 2: The method of Aspect 1, wherein, based at least in part on an AP-TRS associated with the TRS being transmitted and configured with a QCL Type-D resource and a QCL Type-A resource, the TRS is based at least in part on the QCL Type-D resource and the QCL Type-A resource configured for the AP-TRS.

Aspect 3: The method of Aspect 1, wherein, based at least in part on an AP-TRS associated with the TRS being transmitted and not being configured with a QCL Type-D resource and a QCL Type-A resource, the TRS is based at least in part on the first associated QCL Type-D resource of the AP-CSI-RS and a first associated QCL Type-A resource of the AP-CSI-RS.

Aspect 4: The method of Aspect 1, wherein, based at least in part on an AP-TRS associated with the TRS not being transmitted and not being configured with a QCL Type-D resource, the TRS is based at least in part on the first associated QCL Type-D resource of the AP-CSI-RS and a first associated QCL Type-A resource of the AP-CSI-RS.

Aspect 5: The method of any of Aspects 1-4, further comprising: transmitting second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with the first associated QCL Type-D resource; and transmitting or receiving a second reference signal using the first narrow beam.

Aspect 6: The method of any of Aspects 1-4, further comprising: transmitting second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with a second associated QCL Type-D resource that is different than the first associated QCL Type-D resource; and transmitting or receiving a second reference signal using a second narrow beam that is different than the first narrow beam.

Aspect 7: A method of wireless communication performed by a user equipment (UE), comprising: receiving a configuration that configures transmission configuration indicator (TCI) states based at least in part on aperiodic channel state information reference signals (AP-CSI-RSs), wherein each TCI state includes a first resource that is an aperiodic tracking reference signal (AP-TRS) and a second resource that is an AP-CSI-RS; receiving first downlink control information (DCI) that triggers a first AP-CSI-RS resource set that includes AP-CSI-RSs that are each associated with a quasi-co-location (QCL) Type-D resource, wherein the QCL Type-D resource is a TRS or a synchronization signal block (SSB); selecting one or more AP-CSI-RSs based at least in part on AP-CSI-RS measurements; transmitting a report that indicates the one or more AP-CSI-RSs; receiving an activation command that activates a TCI state associated with a first narrow beam, wherein a combination of a first AP-CSI-RS and a first associated QCL Type-D resource uniquely indicates the first narrow beam; and transmitting or receiving a reference signal using the TCI state.

Aspect 8: The method of Aspect 7, further comprising: receiving second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with the first associated QCL Type-D resource; and transmitting or receiving a second reference signal using the first narrow beam.

Aspect 9: The method of Aspect 7, further comprising: receiving second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with a second associated QCL Type-D resource that is different than the first associated QCL Type-D resource; and transmitting or receiving a second reference signal using a second narrow beam that is different than the first narrow beam.

Aspect 10: The method of any of Aspects 7-9, wherein the transmitting the reference signal includes selecting a transmit beam that matches a receive beam of a network entity.

Aspect 11: The method of any of Aspects 7-10, wherein the receiving the reference signal includes selecting a receive beam that matches a transmit beam of a network entity.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
   memory; and
   one or more processors coupled to the memory, the memory comprising instructions executable by the one or more processors to cause the network entity to:
      transmit a configuration that configures transmission configuration indicator (TCI) states based at least in part on aperiodic channel state information reference signals (AP-CSI-RSs), wherein each TCI state includes a first resource that is an aperiodic tracking reference signal (AP-TRS) and a second resource that is an AP-CSI-RS;
      transmit first downlink control information (DCI) that triggers a first AP-CSI-RS resource set that includes AP-CSI-RSs that are each associated with a quasi-co-location (QCL) Type-D resource, wherein the QCL Type-D resource is a TRS or a synchronization signal block (SSB);
      receive a report of one or more AP-CSI-RSs;
      select a first AP-CSI-RS from among the one or more AP-CSI-RSs, wherein a combination of the first AP-CSI-RS and a first associated QCL Type-D resource uniquely indicates a first narrow beam;
      transmit an activation command that activates a TCI state associated with the first narrow beam; and
      transmit or receive a reference signal using the TCI state.

2. The network entity of claim 1, wherein, based at least in part on an AP-TRS associated with the TRS being transmitted and configured with a QCL Type-D resource and a QCL Type-A resource, the TRS is based at least in part on the QCL Type-D resource and the QCL Type-A resource configured for the AP-TRS.

3. The network entity of claim 1, wherein, based at least in part on an AP-TRS associated with the TRS being transmitted and not being configured with a QCL Type-D resource and a QCL Type-A resource, the TRS is based at least in part on the first associated QCL Type-D resource of the AP-CSI-RS and a first associated QCL Type-A resource of the AP-CSI-RS.

4. The network entity of claim 1, wherein, based at least in part on an AP-TRS associated with the TRS not being transmitted and not being configured with a QCL Type-D resource, the TRS is based at least in part on the first associated QCL Type-D resource of the AP-CSI-RS and a first associated QCL Type-A resource of the AP-CSI-RS.

5. The network entity of claim 1, wherein the memory further comprises instructions executable by the one or more processors to cause the network entity to:
   transmit second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with the first associated QCL Type-D resource; and
   transmit or receive a second reference signal using the first narrow beam.

6. The network entity of claim 1, wherein the memory further comprises instructions executable by the one or more processors to cause the network entity to:
   transmit second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with a second associated QCL Type-D resource that is different than the first associated QCL Type-D resource; and
   transmit or receive a second reference signal using a second narrow beam that is different than the first narrow beam.

7. A user equipment (UE) for wireless communication, comprising:
   memory; and
   one or more processors coupled to the memory, the memory comprising instructions executable by the one or more processors to cause the UE to:
      receive a configuration that configures transmission configuration indicator (TCI) states based at least in part on aperiodic channel state information reference signals (AP-CSI-RSs), wherein each TCI state includes a first resource that is an aperiodic tracking reference signal (AP-TRS) and a second resource that is an AP-CSI-RS;
      receive first downlink control information (DCI) that triggers a first AP-CSI-RS resource set that includes AP-CSI-RSs that are each associated with a quasi-co-location (QCL) Type-D resource, wherein the QCL Type-D resource is a TRS or a synchronization signal block (SSB);

select one or more AP-CSI-RSs based at least in part on AP-CSI-RS measurements;

transmit a report that indicates the one or more AP-CSI-RSs;

receive an activation command that activates a TCI state associated with a first narrow beam, wherein a combination of a first AP-CSI-RS and a first associated QCL Type-D resource uniquely indicates the first narrow beam; and transmit or receive a reference signal using the TCI state.

8. The UE of claim 7, wherein the memory further comprises instructions executable by the one or more processors to cause the UE to:

receive second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with the first associated QCL Type-D resource; and transmit or receive a second reference signal using the first narrow beam.

9. The UE of claim 7, wherein the memory further comprises instructions executable by the one or more processors to cause the UE to:

Receive second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with a second associated QCL Type-D resource that is different than the first associated QCL Type-D resource; and transmit or receive a second reference signal using a second narrow beam that is different than the first narrow beam.

10. The UE of claim 7, wherein the memory further comprises instructions executable by the one or more processors to cause the UE to select a transmit beam that matches a receive beam of a network entity.

11. The UE of claim 7, wherein the memory further comprises instructions executable by the one or more processors to cause the UE to select a receive beam that matches a transmit beam of a network entity.

12. A method of wireless communication performed by a network entity, comprising:

transmitting a configuration that configures transmission configuration indicator (TCI) states based at least in part on aperiodic channel state information reference signals (AP-CSI-RSs), wherein each TCI state includes a first resource that comprises an aperiodic tracking reference signal (AP-TRS) and a second resource that comprises an AP-CSI-RS;

transmitting first downlink control information (DCI) that triggers a first AP-CSI-RS resource set that includes AP-CSI-RSs that are each associated with a quasi-co-location (QCL) Type-D resource, wherein the QCL Type-D resource comprises a TRS or a synchronization signal block (SSB);

receiving a report of one or more AP-CSI-RSs;

selecting a first AP-CSI-RS from among the one or more AP-CSI-RSs, wherein a combination of the first AP-CSI-RS and a first associated QCL Type-D resource uniquely indicates a first narrow beam;

transmitting an activation command that activates a TCI state associated with the first narrow beam; and transmitting or receiving a reference signal using the TCI state.

13. The method of claim 12, wherein, based at least in part on an AP-TRS associated with the TRS being transmitted and configured with a QCL Type-D resource and a QCL Type-A resource, the TRS is based at least in part on the QCL Type-D resource and the QCL Type-A resource configured for the AP-TRS.

14. The method of claim 12, wherein, based at least in part on an AP-TRS associated with the TRS being transmitted and not being configured with a QCL Type-D resource and a QCL Type-A resource, the TRS is based at least in part on the first associated QCL Type-D resource of the AP-CSI-RS and a first associated QCL Type-A resource of the AP-CSI-RS.

15. The method of claim 12, wherein, based at least in part on an AP-TRS associated with the TRS not being transmitted and not being configured with a QCL Type-D resource, the TRS is based at least in part on the first associated QCL Type-D resource of the AP-CSI-RS and a first associated QCL Type-A resource of the AP-CSI-RS.

16. The method of claim 12, further comprising:

Transmitting second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with the first associated QCL Type-D resource; and transmitting or receiving a second reference signal using the first narrow beam.

17. The method of claim 12, further comprising:

transmitting second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with a second associated QCL Type-D resource that is different than the first associated QCL Type-D resource; and transmitting or receiving a second reference signal using a second narrow beam that is different than the first narrow beam.

18. A method of wireless communication performed by a user equipment (UE), comprising:

receiving a configuration that configures transmission configuration indicator (TCI) states based at least in part on aperiodic channel state information reference signals (AP-CSI-RSs), wherein each TCI state includes a first resource that is an aperiodic tracking reference signal (AP-TRS) and a second resource that is an AP-CSI-RS;

receiving first downlink control information (DCI) that triggers a first AP-CSI-RS resource set that includes AP-CSI-RSs that are each associated with a quasi-co-location (QCL) Type-D resource, wherein the QCL Type-D resource is a TRS or a synchronization signal block (SSB);

selecting one or more AP-CSI-RSs based at least in part on AP-CSI-RS measurements;

transmitting a report that indicates the one or more AP-CSI-RSs;

receiving an activation command that activates a TCI state associated with a first narrow beam, wherein a combination of a first AP-CSI-RS and a first associated QCL Type-D resource uniquely indicates the first narrow beam; and transmitting or receiving a reference signal using the TCI state.

19. The method of claim 18, further comprising:
receiving second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with the first associated QCL Type-D resource; and
transmitting or receiving a second reference signal using the first narrow beam.

20. The method of claim 18, further comprising:
receiving second DCI that triggers the AP-CSI-RS resource set, wherein a second AP-CSI-RS associated with the second DCI and the first AP-CSI-RS associated with the first DCI are a same AP-CSI-RS, and wherein the second AP-CSI-RS is associated with a second associated QCL Type-D resource that is different than the first associated QCL Type-D resource; and
transmitting or receiving a second reference signal using a second narrow beam that is different than the first narrow beam.

21. The method of claim 18, wherein the transmitting the reference signal includes selecting a transmit beam that matches a receive beam of a network entity.

22. The method of claim 18, wherein the receiving the reference signal includes selecting a receive beam that matches a transmit beam of a network entity.

\* \* \* \* \*